US010466837B2

(12) United States Patent
Matsumoto

(10) Patent No.: US 10,466,837 B2
(45) Date of Patent: *Nov. 5, 2019

(54) DISPLAY DEVICE

(71) Applicant: Japan Display Inc., Tokyo (JP)

(72) Inventor: Shuuichirou Matsumoto, Mobara (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,379

(22) Filed: Jan. 22, 2019

(65) Prior Publication Data

US 2019/0155442 A1 May 23, 2019

Related U.S. Application Data

(63) Continuation of application No. 15/831,688, filed on Dec. 5, 2017, now Pat. No. 10,222,905, which is a
(Continued)

(51) Int. Cl.
*G06F 3/041* (2006.01)
*G06F 3/044* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC ...... G06F 3/041; G06F 3/0412; G06F 3/0416; G06F 3/044; G06F 3/0418; G06F 1/3262;
(Continued)

(56) References Cited

U.S. PATENT DOCUMENTS

2009/0194342 A1  8/2009  Kuo et al.
2009/0256818 A1  10/2009  Noguchi et al.
(Continued)

FOREIGN PATENT DOCUMENTS

JP   2004-334216 A   11/2004
JP   2009-258182 A   11/2009
JP   2011-233018 A   11/2011

OTHER PUBLICATIONS

Japanese Office Action dated Sep. 18, 2018, for corresponding Japanese Patent Application No. 2017-206464, with machine translation.
(Continued)

*Primary Examiner* — Nelson M Rosario
(74) *Attorney, Agent, or Firm* — Michael Best & Friedrich LLP

(57) ABSTRACT

In a liquid crystal display device, a second substrate includes a detection electrode of a touch panel, pixels include pixel electrodes and counter electrodes, the counter electrodes are divided into a plurality of blocks, the counter electrodes of the divided blocks are provided in common to the pixels on a plurality of display lines being side by side, the counter electrodes of the divided blocks are used as scanning electrodes of the touch panel as well, the liquid crystal display device includes a semiconductor chip configured to supply a counter voltage and a touch panel scanning voltage to the counter electrodes of the divided blocks, the semiconductor chip includes a first terminal group formed on a side of a display area side configured by the plurality of pixels.

15 Claims, 19 Drawing Sheets

Related U.S. Application Data continuation of application No. 15/479,364, filed on Apr. 5, 2017, now Pat. No. 9,864,462, which is a continuation of application No. 15/200,925, filed on Jul. 1, 2016, now Pat. No. 9,645,673, which is a continuation of application No. 14/702,619, filed on May 1, 2015, now Pat. No. 9,411,466, which is a continuation of application No. 13/912,242, filed on Jun. 7, 2013, now Pat. No. 9,052,774.

(51) Int. Cl.
    *G02F 1/1333*      (2006.01)
    *G02F 1/1343*      (2006.01)
    *G02F 1/1345*      (2006.01)
    *G02F 1/1362*      (2006.01)
    *G02F 1/1368*      (2006.01)

(52) U.S. Cl.
    CPC ...... *G02F 1/13439* (2013.01); *G02F 1/13452* (2013.01); *G02F 1/134336* (2013.01); *G02F 1/136286* (2013.01); *G06F 3/044* (2013.01); *G06F 3/0412* (2013.01); *G02F 2001/136295* (2013.01); *G02F 2201/121* (2013.01); *G02F 2201/123* (2013.01); *G06F 2203/04102* (2013.01); *G06F 2203/04103* (2013.01)

(58) Field of Classification Search
    CPC . G06F 1/3265; G09G 3/3696; G02F 1/13338; G02F 1/134363; G02F 2201/121; Y02B 60/1242

See application file for complete search history.

(56) References Cited

U.S. PATENT DOCUMENTS

| | | | |
|---|---|---|---|
| 2010/0066692 A1* | 3/2010 | Noguchi | G06F 3/0412 345/173 |
| 2010/0085320 A1 | 4/2010 | Kuwajima et al. | |
| 2010/0110040 A1 | 5/2010 | Kim et al. | |
| 2010/0231554 A1 | 9/2010 | Anno et al. | |
| 2012/0062481 A1 | 3/2012 | Kim et al. | |
| 2012/0242615 A1* | 9/2012 | Teraguchi | G06F 3/0412 345/174 |
| 2013/0069924 A1* | 3/2013 | Robinson | G09G 3/20 345/207 |

OTHER PUBLICATIONS

Japanese Office Action dated Dec. 18, 2018, for the corresponding JP Patent Application No. 2017-206464, with English translation.

* cited by examiner

DISPLAY DEVICE

CROSS-REFERENCE TO RELATED APPLICATIONS

This application is a continuation of U.S. patent application Ser. No. 15/831,688, filed on Dec. 5, 2017, which, in turn U.S. patent application Ser. No. 15/479,364 (now U.S. Pat. No. 9,864,462), filed on Apr. 5, 2017, which, in turn, is a continuation of U.S. patent application Ser. No. 15/200,925, filed on Jul. 1, 2016 (now U.S. Pat. No. 9,645,673), which, in turn, is a continuation of U.S. patent application Ser. No. 14/702,619, filed on May 1, 2015 (now U.S. Pat. No. 9,411,466), which, in turn, is a continuation of U.S. patent application Ser. No. 13/912,242, filed on Jun. 7, 2013 (now U.S. Pat. No. 9,052,774). Further, this application claims priority from Japanese application No. 2012-131154 filed on Jun. 8, 2012, the entire contents of which are hereby incorporated by reference into this application.

BACKGROUND OF THE INVENTION

1. Field of the Invention

The present invention relates to a liquid crystal display device and, more particularly, to a technique effectively applied to an in-cell type liquid crystal display device incorporating a touch panel.

2. Description of the Related Art

A display device including a device (hereinafter also referred to as touch sensor or touch panel) for inputting information by the touch operation (contact pressing operation, hereinafter simply referred to as touch) using the user's finger, a pen or the like on the display surface is used in mobile electronic apparatuses such as a PDA and a portable terminal, various home electric appliances, an automated teller machine, and the like.

As such a touch panel, there is known a capacitance type touch panel that detects a capacitance change of a touched port ion.

As the capacitance type touch panel, as disclosed in JP 2009-258182 A, there is known a liquid crystal display device including a so-called in-cell touch panel in which a touch panel function is incorporated in a liquid crystal display panel.

In the in-cell touch panel, a counter electrode (also referred to as common electrode (CT)) formed on a first substrate (also referred to as TFT substrate) included in the liquid crystal display panel is divided and used as scanning electrode of the touch panel.

SUMMARY OF THE INVENTION

In general, in the in-cell touch panel, a scanning line driving circuit for driving a scanning line (a gate line) is normally incorporated in the inside of the liquid crystal display panel.

As the liquid crystal display panel, there are a liquid crystal display panel incorporating a driving circuit configured by an n-type amorphous silicon thin-film transistor in which an amorphous silicon layer is used as a semiconductor layer (hereinafter referred to as driving circuit having the a-Si single channel circuit configuration), a liquid crystal display panel incorporating a driving circuit having a single channel circuit configuration configured by a polysilicon thin-film transistor in which a p-type or n-type polysilicon layer is used as a semiconductor layer (hereinafter referred to as driving circuit having the p-Si single channel circuit configuration), and a driving circuit having a CMOS circuit configuration including a p-type polysilicon thin-film transistor and an n-type polysilicon thin-film transistor in which p-type and n-type polysilicon layers are used as semiconductor layers (hereinafter referred to as driving circuit having the CMOS circuit configuration).

In developing a touch sense function incorporating liquid crystal driver IC adapted to the in-cell touch panel, development costs and a development period increase if the liquid crystal driver IC is separately developed for each of the liquid crystal display panel including the driving circuit having the a-Si single channel circuit configuration, the liquid crystal display panel including the driving circuit having the p-Si single channel circuit configuration, and the liquid crystal display panel including the driving circuit having the CMOS circuit configuration.

The present invention has been devised in order to solve the problem of the related art and it is an object of the present invention to provide a technique for enabling a reduction in development costs and a reduction in a development period of a liquid crystal driver IC in a liquid crystal display device incorporating a touch panel function.

The object and other objects and new characteristic of the present invention are clarified by the description of this specification and the accompanying drawings.

Overviews of representative inventions among inventions disclosed in this application are briefly explained below.

(1) A liquid crystal display device including a liquid crystal display panel including a first substrate, a second substrate, and liquid crystal held between the first substrate and the second substrate, the liquid crystal display device including a plurality of pixels arranged in a matrix shape, wherein the second substrate includes a detection electrode of a touch panel, the pixels include pixel electrodes and counter electrodes, the counter electrodes are divided into a plurality of blocks, the counter electrodes of the divided blocks are provided in common to the pixels on a plurality of display lines being side by side, the counter electrodes of the divided blocks are used as scanning electrodes of the touch panel as well, the liquid crystal display device includes a semiconductor chip configured to supply a counter voltage and a touch panel scanning voltage to the counter electrodes of the divided blocks, the semiconductor chip includes a first terminal group formed on a side of a display area side configured by the plurality of pixels, and a plurality of terminals arranged on both sides of the semiconductor chip in the first terminal group are terminals for supplying the counter voltage and the touch panel scanning voltage to the counter electrodes of the divided blocks.

(2) In (1), when the number of divisions of the counter electrodes is represented as M ($1 \leq M \leq 24$), the plurality of terminals arranged on both the sides of the semiconductor chip are M terminals A1 arranged at one end and M terminals A2 arranged at the other end, and the semiconductor chip can be switched to a mode for supplying, from each of the plurality of terminals A1 and the plurality of terminals A2, the touch panel scanning voltage to the counter electrodes sequentially selected among the counter electrodes of the divided blocks and supplying the counter voltage to the counter electrodes other than the selected counter electrodes and a mode for outputting the counter voltage from first to Nth ($1 \leq N$ (e.g., $N=M/2$)$<24$) terminals among the M terminals A1 and the M terminals A2 and outputting the touch panel scanning voltage from the remaining Nth to Mth terminals.

(3) in (2), the first substrate includes a plurality of scanning lines for inputting a scanning voltage to the pixels and a scanning line driving circuit configured to supply the scanning voltage to the plurality of scanning lines, the scanning line driving circuit is a circuit incorporated in the inside of the liquid crystal display panel and configured using only either n-type or p-type transistor, and the semiconductor chip supplies, from each of the plurality of terminals A1 and the plurality of terminals A2, the touch panel scanning voltage to the counter electrodes sequentially selected the counter electrodes of the divided blocks and supplies the counter voltage to the counter electrodes other than the selected counter electrodes.

(4) In (2), the first substrate includes a plurality of scanning lines for inputting a scanning voltage to the pixels, a scanning line driving circuit configured to supply the scanning voltage to the plurality of scanning lines, and a counter electrode selecting circuit configured to select the counter electrodes of the divided blocks, the counter electrode selecting circuit is arranged between the scanning line driving circuit and a display area, the counter electrode selecting circuit is a circuit incorporated in the inside of the liquid crystal display panel and having a CMOS circuit configuration, and the semiconductor chip supplies, to the counter electrode selecting circuit, the counter voltage from first to Nth ($1 \leq N < 24$) terminals among the M terminals A1 and the M terminals A2 and supplies the touch panel scanning voltage from the remaining Nth to Mth terminals.

(5) A liquid crystal display device including a liquid crystal display panel including a first substrate, a second substrate, and liquid crystal held between the first substrate and the second substrate, the liquid crystal display device including a plurality of pixels arranged in a matrix shape, wherein the second substrate includes a detection electrode of a touch panel, the first substrate includes a plurality of scanning lines for inputting a scanning voltage to the pixels and a first scanning line driving circuit and a second scanning line driving circuit arranged on both sides of a display area, which are configured by the plurality of pixels, and configured to supply the scanning voltage to the plurality of scanning lines, the first scanning line driving circuit and the second scanning line driving circuit are circuits incorporated in the inside of the liquid crystal display panel, the pixels include pixel electrodes and counter electrodes, the counter electrodes are divided into a plurality of blocks, the counter electrodes of the divided blocks are provided in common to the pixels on a plurality of display lines being side by side, the counter electrodes of the divided blocks are used as scanning electrodes of the touch panel as well, the liquid crystal display device includes a semiconductor chip configured to supply a counter voltage and a touch panel scanning voltage to the counter electrodes of the divided blocks and supply a display control signal to the first scanning line driving circuit and the second scanning line driving circuit, the semiconductor chip includes a second terminal group formed on a side on the opposite side of the display area configured by the plurality of pixels, a plurality of terminals arranged at one end of the semiconductor chip in the second terminal group are terminals B1 for supplying the display control signal to the first scanning line driving circuit, and a plurality of terminals arranged at the other end of the semiconductor chip in the second terminal group are terminals B2 for supplying the display control signal to the second scanning line driving circuit.

(6) In (5), a type of the display control signal supplied from the plurality of terminals B1 to the first scanning line driving circuit and a type of the display control signal supplied from the plurality of terminals B2 to the second scanning driving circuit are different on the basis of data set in a register on the inside of the semiconductor chip.

(7) In (5), the liquid crystal display device includes a first counter electrode selecting circuit and a second counter electrode selecting circuit arranged on both sides of the display area, which is configured by the plurality of pixels, and configured to select the counter electrodes of the divided blocks, the first counter electrode selecting circuit and the second counter electrode selecting circuit are circuits incorporated in the inside of the liquid crystal display panel, and the plurality of terminals B1 and the plurality of terminals B2 also include terminals for supplying an address signal to the first counter electrode selecting circuit and the second counter electrode selecting circuit.

(8) A liquid crystal display device including a liquid crystal display panel including a first substrate, a second substrate, and liquid crystal held between the first substrate and the second substrate, the liquid crystal display device including a plurality of pixels arranged in a matrix shape, wherein the second substrate includes a detection electrode of a touch panel, the pixels include pixel electrodes and counter electrodes, the counter electrodes are divided into a plurality of blocks, the counter electrodes of the divided blocks are provided in common to the pixels on a plurality of display lines being side by side, the counter electrodes of the divided blocks are used as scanning electrodes of the touch panel as well, the liquid crystal display device includes a semiconductor chip configured to supply a counter voltage and a touch panel scanning voltage to the counter electrodes of the divided blocks, the semiconductor chip includes a second terminal group formed on a side on the opposite side of a display area configured by the plurality of pixels, a plurality of terminals arranged in the center of the semiconductor chip in the second terminal group are terminals D to which an input signal group from the outside is input, a plurality of terminals arranged at one end of the semiconductor chip in the second terminal group are terminals B1 for supplying the display control signal to the first scanning line driving circuit, a plurality of terminals arranged at the other end of the semiconductor chip in the second terminal group are terminals B2 for supplying the display control signal to the second scanning line driving circuit, and terminals C arranged between the terminals D and the terminals B1 and terminals C2 arranged between the terminals D and the terminals B2 are terminals to which a detection voltage from the detection electrode is input.

(9) In (8), either the terminals C1 or the terminals C2 are used, but not both.

An effect obtained by the representative invention among the inventions disclosed in this application is briefly explained below.

With the liquid crystal display device incorporating the touch panel function according to the present invention, it is possible to reduce manufacturing costs and reduce a development period of a liquid crystal driver IC.

DETAILED DESCRIPTION OF THE INVENTION

Figure 1:
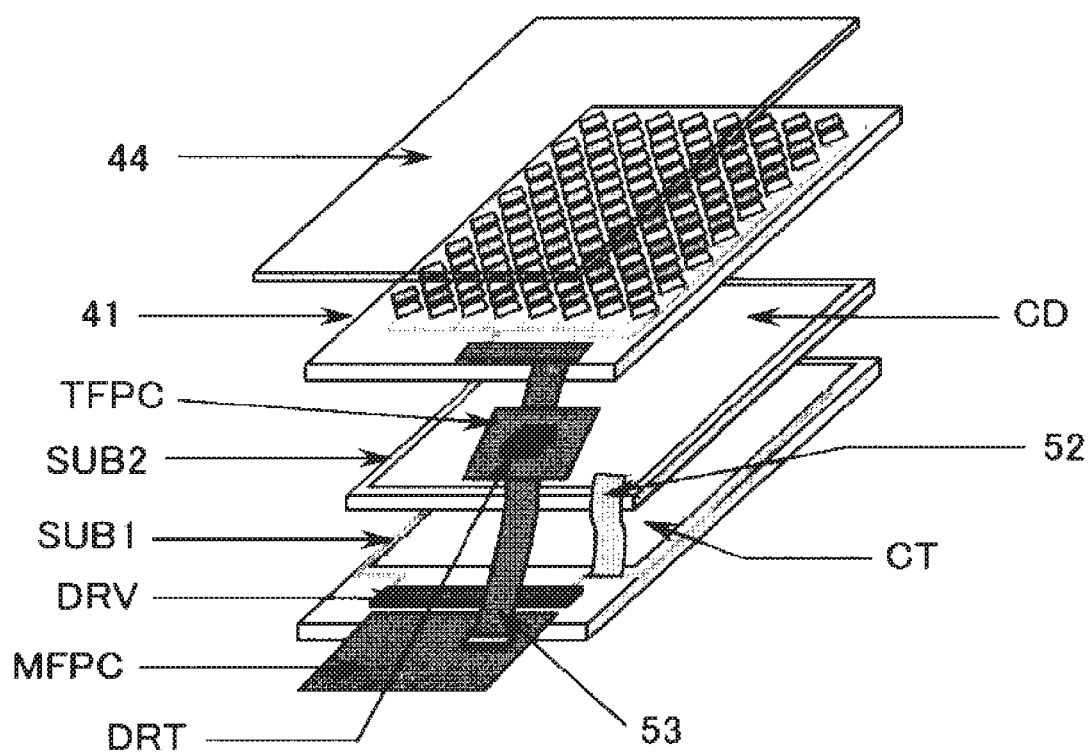
FIG. 1 is an exploded perspective view showing a schematic configuration of a touch panel-attached liquid crystal display device of the related art.

An embodiment of the present invention is explained in detail below with reference to the accompanying drawings.

In all the figures for explaining the embodiment, components having the same functions are denoted by the same reference numerals and signs and repeated explanation of the components is omitted. The embodiment explained below is not an embodiment for limiting the interpretation of the scope of the claims of the present invention.

FIG. 1 is an exploded perspective view showing a schematic configuration of a touch panel-attached liquid crystal display device of the related art.

Figure 2:
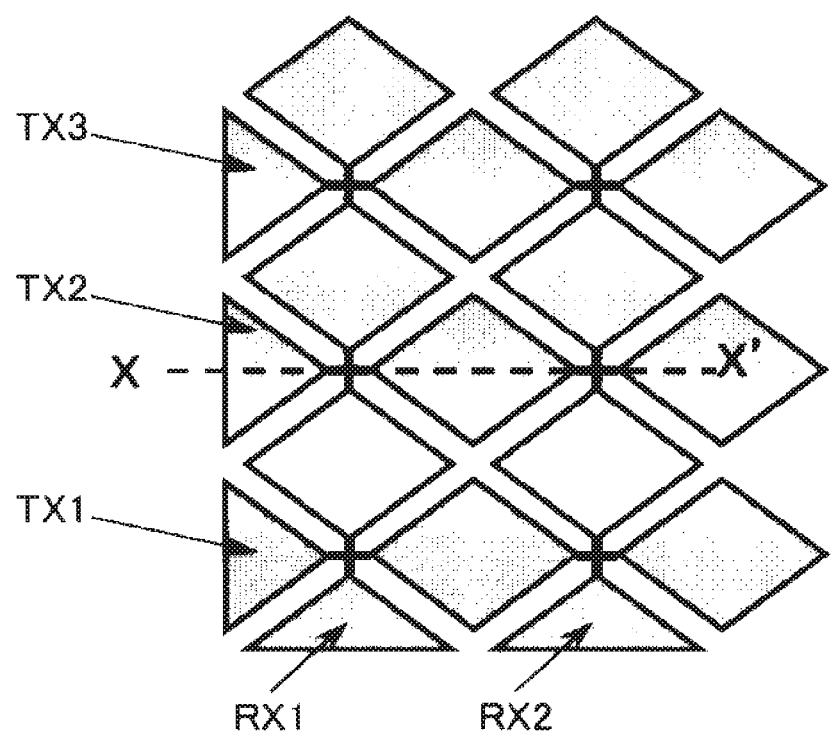
FIG. 2 is a plan view showing an electrode configuration of the touch panel shown in FIG. 1.

FIG. 2 is a plan view showing an electrode configuration of the touch panel shown in FIG. 1.

Figure 3:
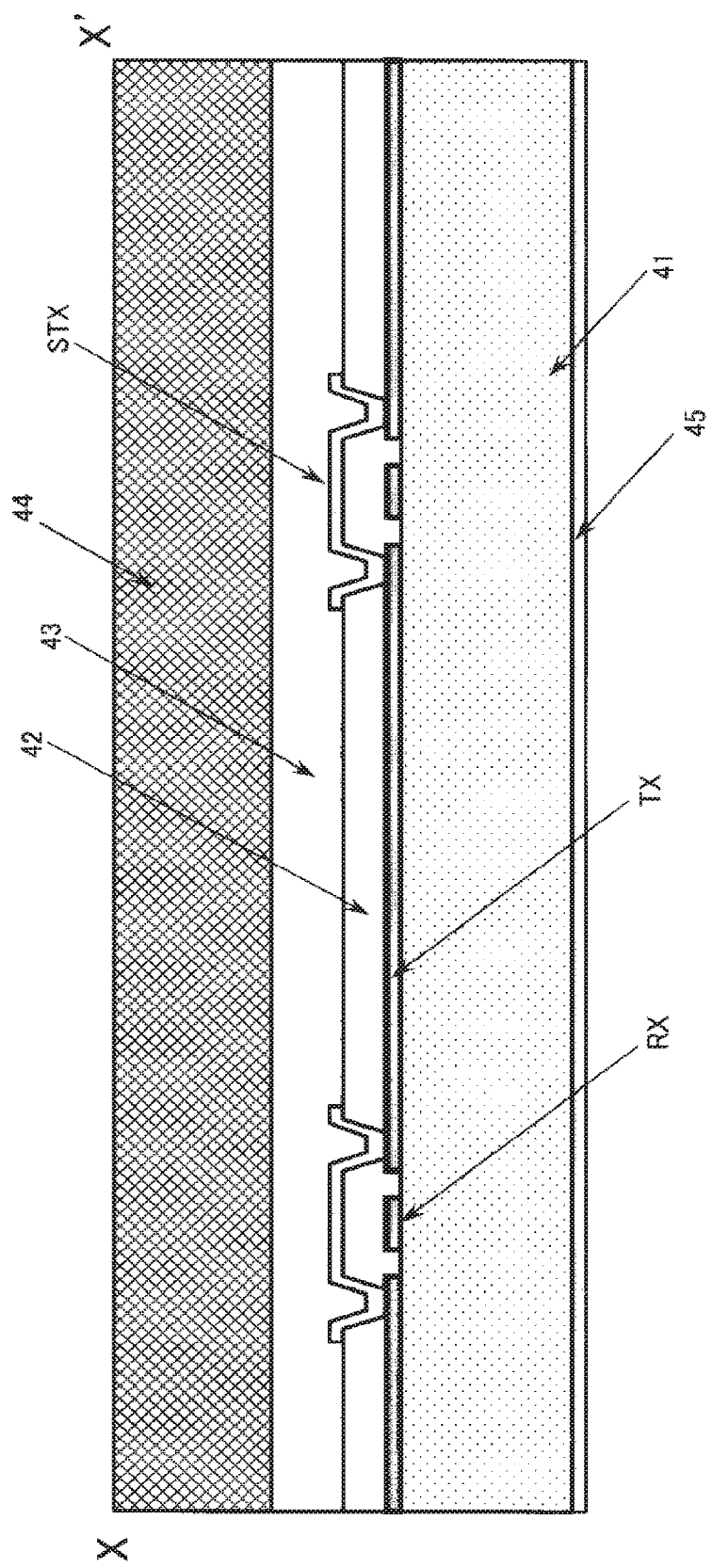
FIG. 3 is a sectional view showing a sectional structure of the touch panel shown in FIG. 1.

FIG. 3 is a sectional view showing a sectional structure of the touch panel shown in FIG. 1.

In general, the touch panel includes, as shown in FIG. 2, scanning electrodes (TX) and detection electrodes (RX) for capacitance detection. For example, three scanning electrodes (TX1 to TX3) are shown as the scanning electrodes (TX) and two detection electrodes (RX1 and RX2) are shown as the detection electrodes (RX). However, the numbers of the electrodes are not limited to these numbers.

The touch panel includes, as shown in FIGS. 1 and 3, a touch panel substrate 41, the scanning electrodes (TX) and the detection electrodes (RX) formed on the touch panel substrate 41, an interlayer insulating film 42 formed on the scanning electrodes (TX) and the detection electrodes (RX), connecting sections (STX) formed on the interlayer insulating film 42 and configured to electrically connect the scanning electrodes (TX), a protective film 43 formed on the connecting sections (STX), a front window (or a protective film) 44 arranged on the protective film 43, and a shield transparent electrode (e.g., an electrode formed by an ITO (Indium Tin Oxide) film) 45 formed on a liquid crystal display panel side of the touch panel substrate 41.

In the touch panel in the past, a touch panel control IC (DRT) pulse-drives the scanning electrodes (TX) at a voltage of about 5 V to 10 V, detects a voltage change in the detection electrodes (RX), and detects a touch position. That is, a capacitance value between the scanning electrodes (TX) and the detection electrodes (RX) changes because of a finger or the like. When the scanning electrodes (TX) are pulse-driven, voltage fluctuation detected by the detection electrodes (RX) changes. Therefore, it is possible to detect the touch position by measuring the voltage of the detection electrodes (RX).

The touch panel is set on the front surface of the liquid crystal display panel. Therefore, when a user views an image displayed on the liquid crystal display panel, the displayed image needs to be transmitted through the touch panel. Therefore, the touch panel desirably has high light transmittance.

The liquid crystal display panel includes, as shown in FIG. 1, a first substrate (SUB1; hereinafter referred to as TFT substrate), a second substrate (SUB2; hereinafter referred to as CF substrate), and liquid crystal (not shown in the figure) held between the TFT substrate (SUB1) and the CF substrate (SUB2).

The TFT substrate (SUB1) has an area larger than the area of the CF substrate (SUB2). A liquid crystal driver IC (DRV) is mounted on a region of the TFT substrate (SUB1) not opposed to the CF substrate (SUB2). Further, a main flexible printed circuit board (MFPC) is mounted on a peripheral section of one side of the region.

In FIG. 1, CT denotes a counter electrode (also referred to as common electrode), TFPC denotes a flexible printed circuit board for a touch panel, CD denotes a rear-side transparent conductive film, 52 denotes a connecting member, and 53 denotes a connection flexible printed circuit board.

In an IPS-type liquid crystal display panel, unlike a TN-type liquid crystal display panel and a VA-type liquid crystal display panel, the counter electrode (CT) is absent on a substrate on which a color filter is provided. Therefore, for example, to reduce display noise, the rear-side transparent conductive film (CD) formed by a transparent conductive film such as an ITO is formed on the substrate on which the color filter is provided.

Figure 4:
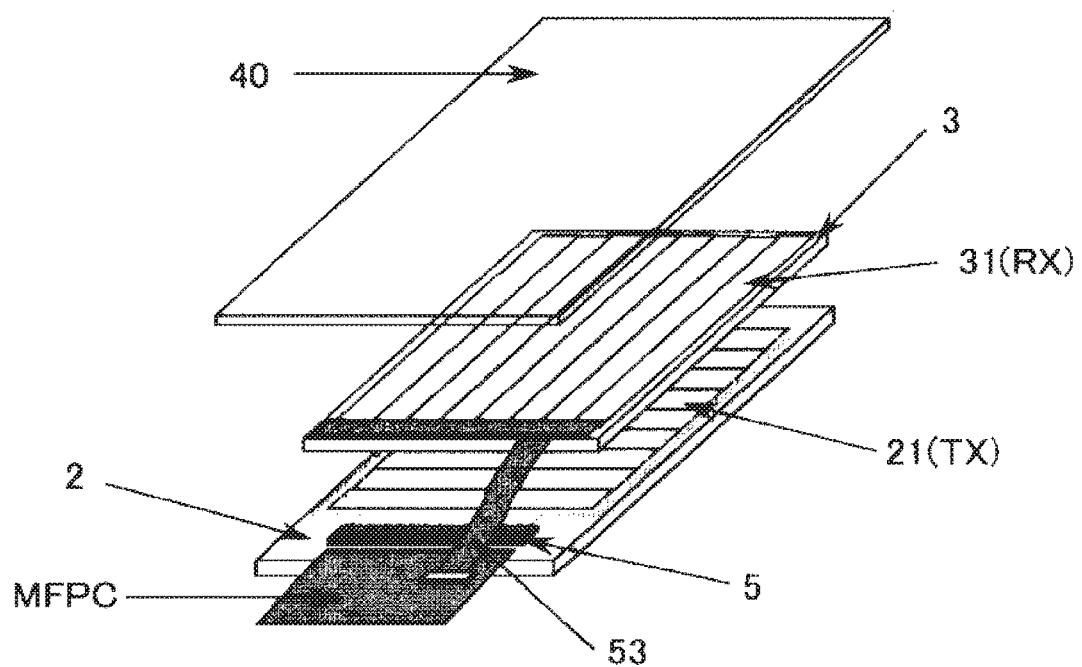
FIG. 4 is an exploded perspective view showing a schematic configuration of a touch panel-incorporating liquid crystal display device.

FIG. 4 is an exploded perspective view showing a schematic configuration of a touch panel-incorporating liquid crystal display device in which a touch panel is incorporated in the inside of the liquid crystal display panel.

In FIG. 4, 2 denotes a TFT substrate, 3 denotes a CF substrate, 21 denotes a counter electrode (also referred to as common electrode), 5 denotes a liquid crystal driver IC, MFPC denotes a main flexible printed circuit board, 40 denotes a front window, and 53 denotes a connection flexible printed circuit board.

In the liquid crystal display device shown in FIG. 4, the rear-side transparent conductive film (CD) on the CF substrate 3 is divided into belt-like patterns to form detection electrodes (RX) 31 of the touch panel. The counter electrode 21 formed on the inside of the TFT substrate 2 is divided into belt-like patterns, i.e., a plurality of blocks and used as scanning electrodes (TX) of the touch panel as well to reduce the touch panel substrate (41 in FIG. 1). Therefore, in the liquid crystal display device shown in FIG. 4, a function of the touch panel control IC (DRT) shown in FIG. 1 is provided on the inside of the liquid crystal driver IC 5.

The counter electrode 21 and the detection electrode 31 of the liquid crystal display device shown in FIG. 4 are explained with reference to FIG. 5.

As explained above, the counter electrode 21 is provided on the TFT substrate 2. A plurality of (e.g., about twenty) counter electrodes 21 are connected in common at both ends and connected to a counter electrode signal line 22.

Figure 5:
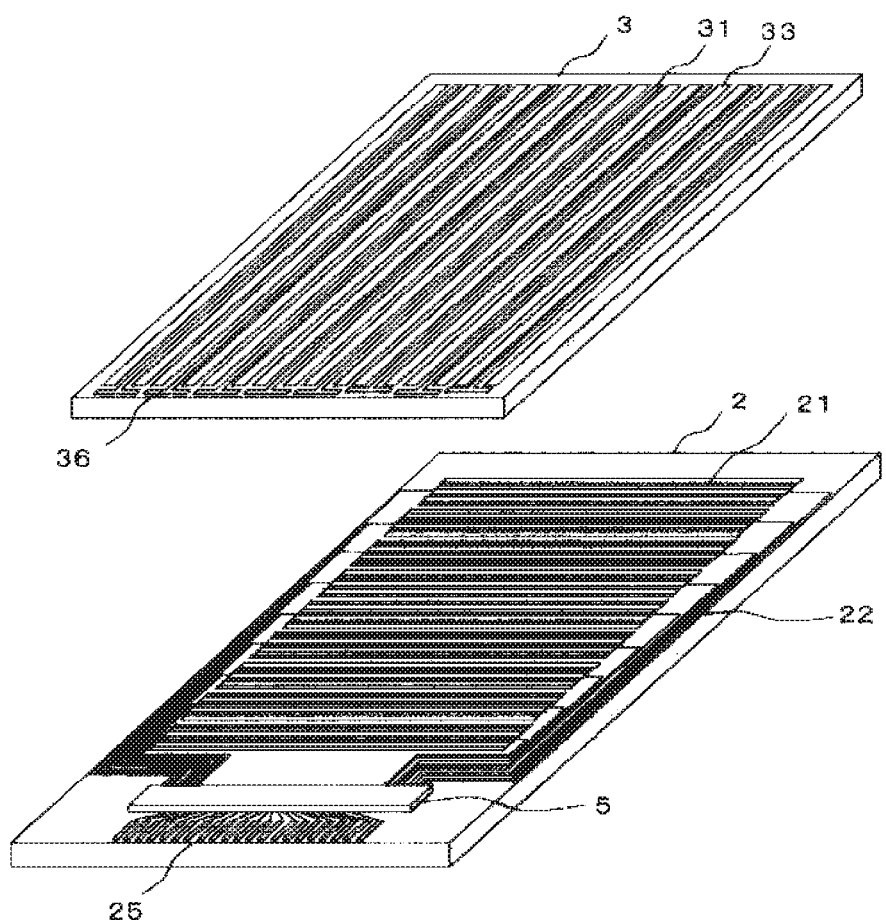
FIG. 5 is a diagram for explaining counter electrodes and detection electrodes in the touch panel-incorporating liquid crystal display device shown in FIG. 4.

In the liquid crystal display device shown in FIG. 5, bundle-like counter electrodes 21 are used as the scanning electrodes (TX) as well and detection electrodes 31 configure the detection electrodes (RX).

Therefore, a counter electrode signal includes a counter voltage used for image display and a touch panel scanning voltage used for detection of a touch position. When the touch panel scanning voltage is applied to the counter electrodes 21, detection signals are generated in the detection electrodes 31 arranged a fixed space away from the counter electrode 21 to configure capacitors. The detection signals are extracted to the outside via detection electrode terminals 36.

Dummy electrodes 33 are formed on both sides of the detection electrodes 31. The detection electrodes 31 expand toward the dummy electrodes 33 side at one ends to form T-shaped detection electrode terminals 36. Various wires, terminals, and the like such as driving circuit input terminals 25 are formed on the TFT substrate 2 besides the counter electrode signal line 22.

Figure 6:
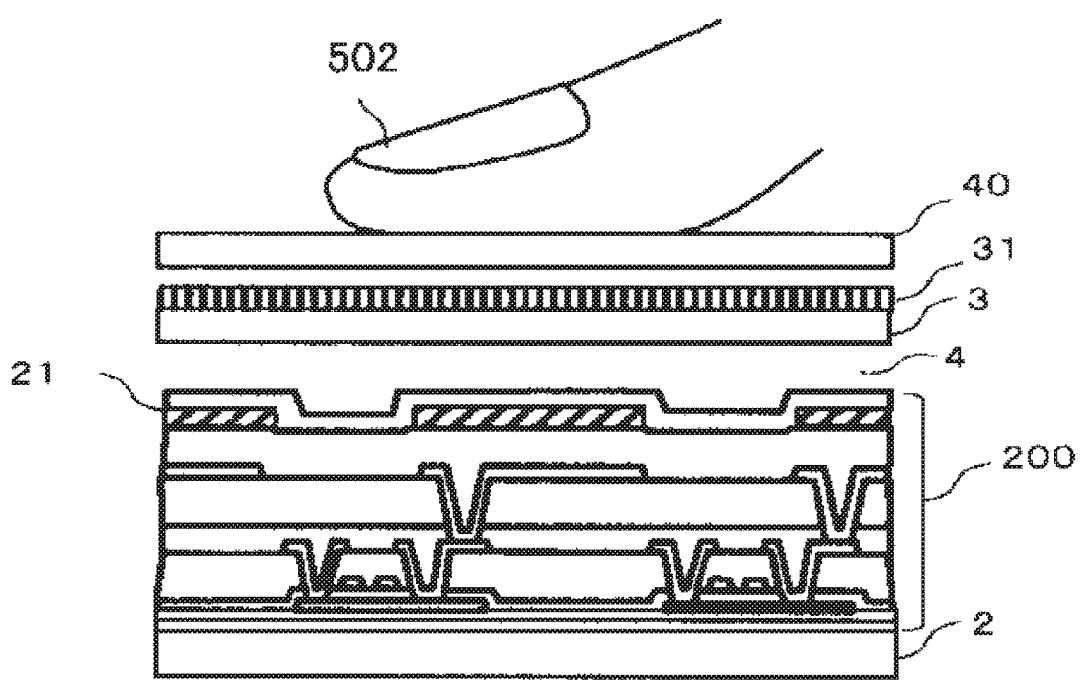
FIG. 6 is a schematic sectional view showing in enlargement a part of the cross section of a display area of the touch panel-incorporating liquid crystal display device shown in FIG. 4.

A schematic sectional view in which a part of the cross section of a display area in the liquid crystal display device shown in FIG. 4 is enlarged is shown in FIG. 6.

As shown in FIG. 6, a pixel section 200 is provided on the TFT substrate 2. The counter electrodes 21 are used for image display as a part of pixels. A liquid crystal composition 4 is held between the TFT substrate 2 and the CF substrate 3. The detection electrodes 31 provided on the CF substrate 3 and the counter electrodes 21 provided on the TFT substrate form capacitors. When a driving signal is applied to the counter electrodes 21, the voltage of the detection electrodes 31 changes.

At this point, as shown in FIG. 6, when a conductor such as a finger 502 comes closer to or comes into contact with the front window 40, a change occurs in capacitance and a change occurs in the voltage generated in the detection electrodes 31 compared with the voltage generated when the conductor does not come close to or come into contact with the front window 40.

In this way, the change in the capacitance generated between the counter electrodes 21 and the detection electrodes 31 formed on the liquid crystal display panel is detected. Consequently, it is possible to provide a function of a touch panel in the liquid crystal display panel.

Figure 7:
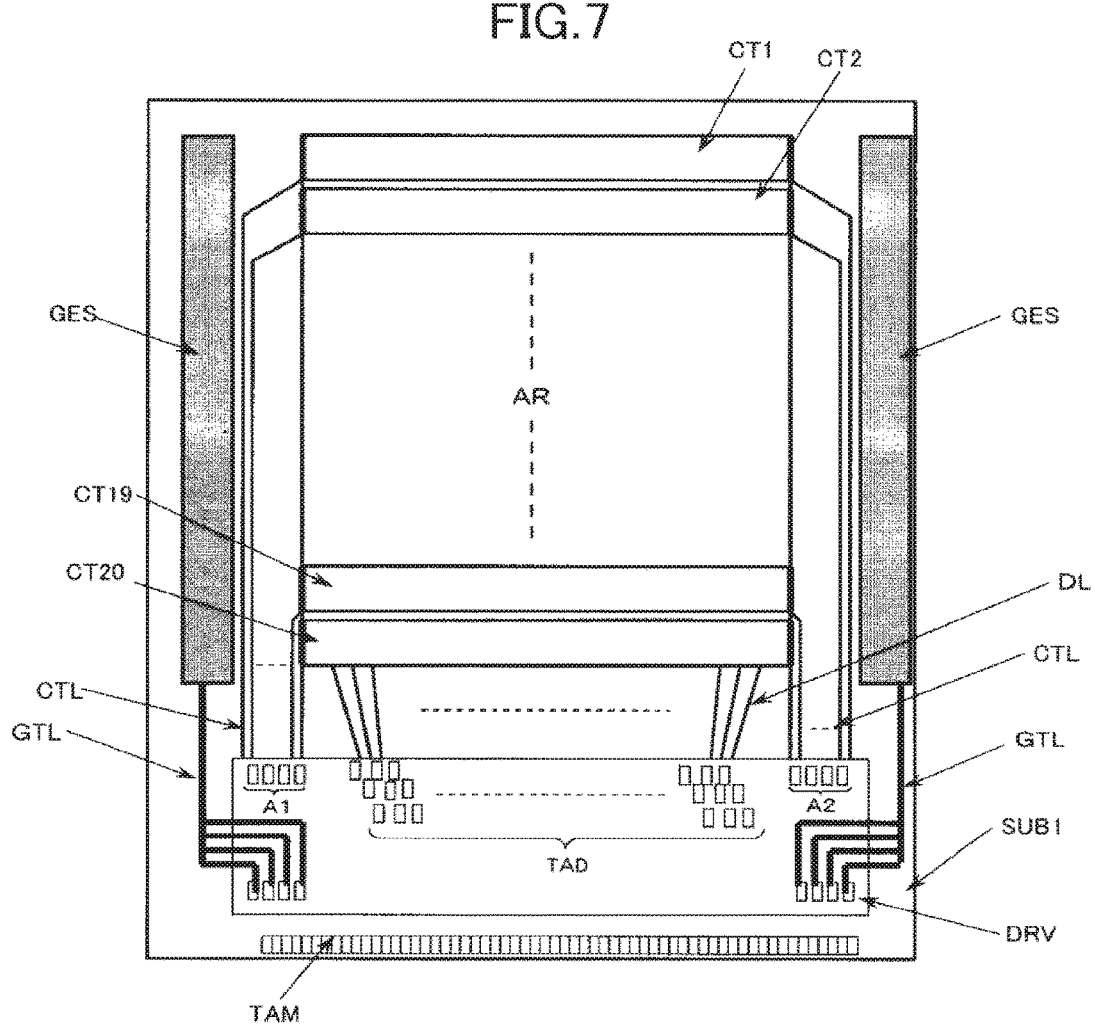
FIG. 7 is a plan view showing an example of counter electrodes divided into a plurality of blocks in an example of a liquid crystal display device applied with the present invention.

FIG. 7 is a plan view showing an example of the counter electrodes divided in the plurality of blocks in an example of the liquid crystal display device applied with the present invention. In FIG. 7, SUB1 denotes a TFT substrate, DRV denotes a liquid crystal driver IC, CT1 to CT20 denote the counter electrodes of the blocks divided into belt-like patterns, DL denotes video lines, CTL denotes counter electrode wires, GES denotes scanning line driving circuits, GTL denotes scanning line driving circuit signal wires, TAM denotes a terminal section connected to the main flexible printed circuit board (MFPC), and AR denotes a display area configured by a plurality of pixels arranged in a matrix shape.

In the example shown in FIG. 7, as the scanning line driving circuits (GES), driving circuits having an a-Si single channel circuit configuration or driving circuits having a p-Si single channel circuit in which an n-type polysilicon layer is used as a semiconductor layer are used.

In a capacitance type touch panel, since a change in capacitance due to a finger or the like is detected, the width of the scanning electrodes (TX) for the touch panel that performs alternating-current driving is desirably about 4 to 5 mm. Therefore, the number of scanning electrodes (TX) increases according to an increase in the size of the liquid crystal display panel.

In the example shown in FIG. 7, the counter electrodes (CT) of 1280 display lines are divided into twenty blocks CT1 to CT20 (one block is configured by counter electrodes of sixty-four display lines). Twenty counter electrode wires (CTL) are necessary on each of the left and the right.

The counter electrodes (CT1 to CT20) of the blocks cause image quality deterioration when voltage fluctuation is caused by parasitic capacitance in a display operation. Therefore, it is necessary to reduce a resistance value of the counter electrode wires (CTL) that connect the counter electrodes (CT1 to CT20) of the blocks and the liquid crystal driver IC (DRV). Since wires are present on the scanning line driving circuits (GES) as well, the counter electrode wires (CTL) cannot be wired on the scanning line driving circuits (GES).

Therefore, the counter electrode wires (CTL) are arranged further on the counter electrode (CT) side than the scanning line driving circuits (GES).

To correspond to the arrangement, in the liquid crystal driver IC (DRV), a video line driving terminal (TAD) connected to a video line (not shown in the figure) is arranged in the center of the display area (AR) of the semiconductor chip. Terminals (A1 and A2) connected to the counter electrode wires (CTL) are arranged at both left and right ends of the video line driving terminal (TAD).

Figure 8:
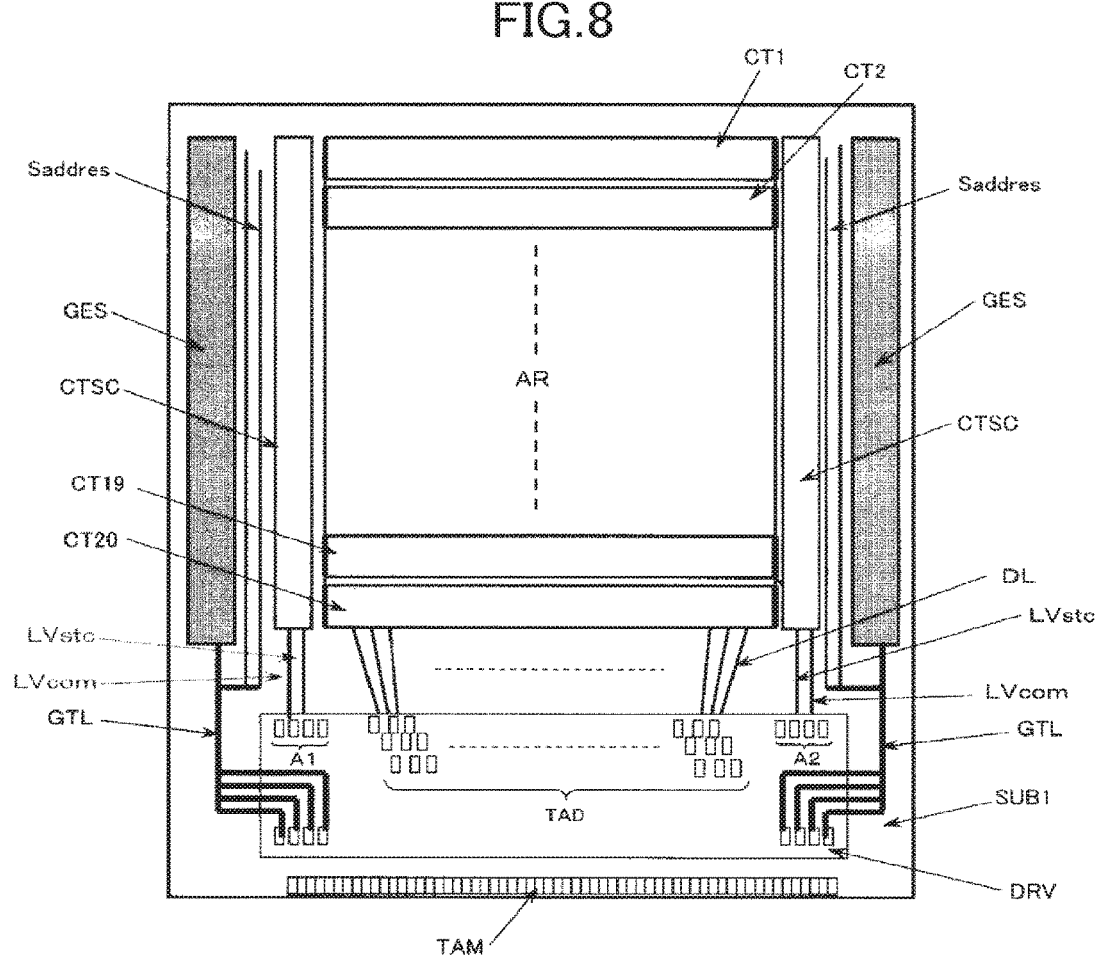
FIG. 8 is a plan view for explaining a method of driving counter electrodes divided into a plurality of blocks in another example of the liquid crystal display device applied with the present invention.

FIG. 8 is a plan view for explaining a method of driving counter electrodes divided into a plurality of blocks in another example of the liquid crystal display device applied with the present invention.

The liquid crystal display device shown in FIG. 8 is different from the liquid crystal display device shown in FIG. 7 in that counter electrode selecting circuits (CTSC) configured to select, with an address decode system, the respective counter electrodes (CT1 to CT2) divided into twenty blocks is incorporated in the inside of the liquid crystal display panel.

In FIG. 8, driving circuits having a CMOS circuit configuration are used as the counter electrode selecting circuits (CTSC).

Since a method of selecting the counter electrodes (CT1 to CT20) divided into the twenty blocks is the address decode system, wires that require low resistance are two wires, i.e., a wire (LVcom) for a counter voltage (Vcom) supplied to the counter electrodes (CT1 to CT20) and a wire (LVstc) for a touch panel scanning voltage (Vstc).

In this embodiment, as the touch panel scanning voltage (Vstc), a voltage higher than the counter voltage (Vcom) by 5 to 10 V is supplied as a direct current. Selection of a scanning place is performed according to an address signal (addres) supplied via an address signal line (Saddres). The counter voltage (Vcom) or the touch panel scanning voltage (Vstc) is switched and output to the counter electrode (CT) of a selected block, which is used as the scanning electrode (TX) as well, according to a touch panel scanning signal (STC).

Even when the number of divisions of the counter electrode (CT) increases, a wire to be added is only the address signal line (Saddres). It is possible to increase the number of divisions of the counter electrode used as the touch panel scanning electrode while keep on suppressing an increase in left and right frames of the liquid crystal display panel.

Figure 9:
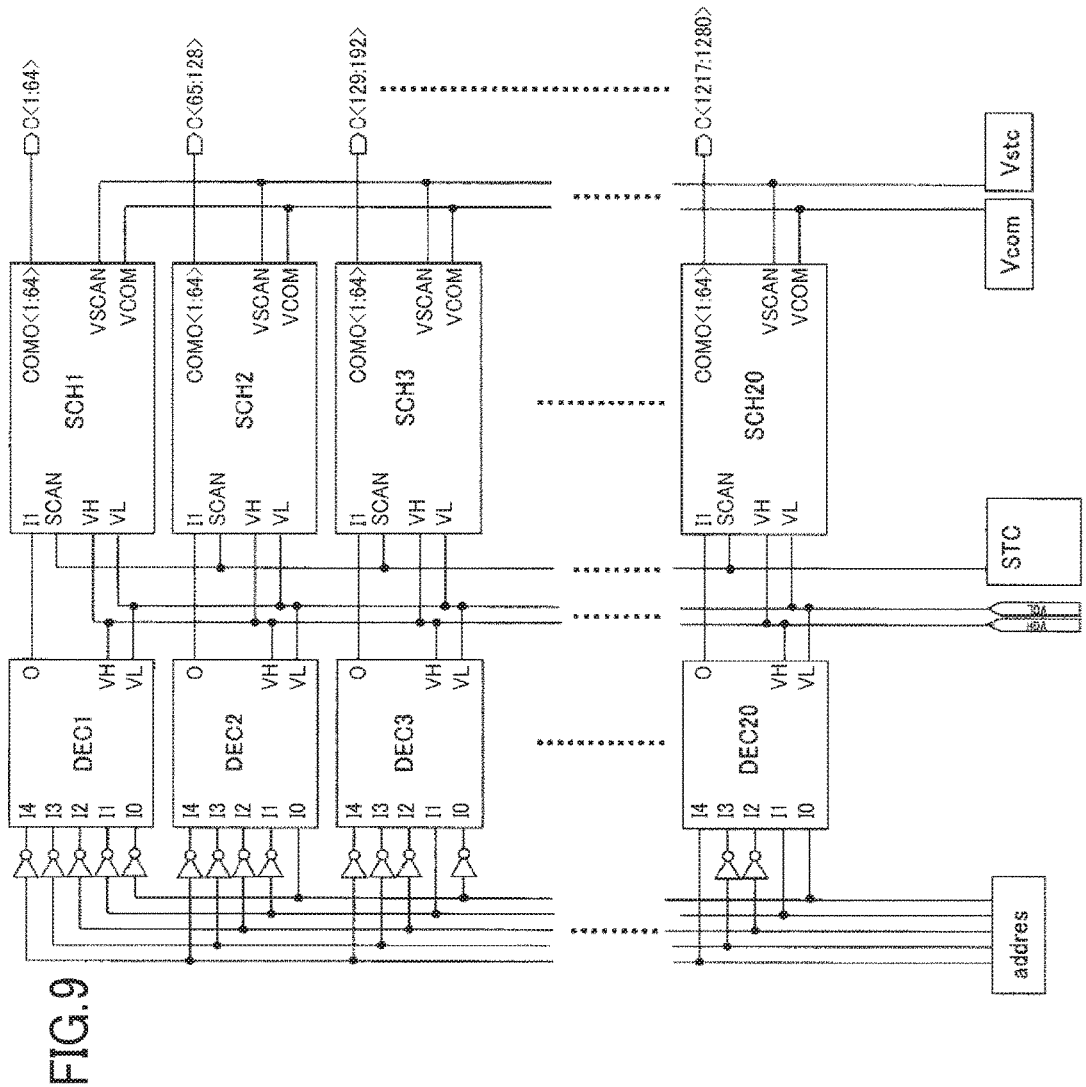
FIG. 9 is a block diagram showing a configuration example of a counter electrode selecting circuit shown in FIG. 8.

FIG. 9 is a block diagram showing a configuration example of the counter electrode selecting circuits (CTSC) shown in FIG. 8. As shown in FIG. 9, the counter electrode selecting circuit (CTSC) includes address decoder circuits DEC1 to DEC20 and selection circuits SCH1 to SCH20.

In the liquid crystal display device shown in FIG. 8, the counter electrodes (CT) for sixty-four display lines are electrically connected on the inside of the liquid crystal display panel to form one block and 1280 display lines are divided into twenty such that the scanning electrodes (TX) of the touch panel are arranged at a 5 mm pitch. The counter electrodes (CT1 to CT20) divided into twenty and the address decoder circuits (DEC1 to DEC20) are allocated in a one-to-one relation. Since the number of divisions is twenty blocks, five 5-bit address signal lines (Sadd) are necessary.

The counter electrodes of one block, i.e., the counter electrodes (CT) equivalent to sixty-four lines selected according to the address signal (addres) perform alternating-current driving according to the touch panel scanning signal (STC). The other counter electrodes (CT) output a counter voltage.

Figure 10:
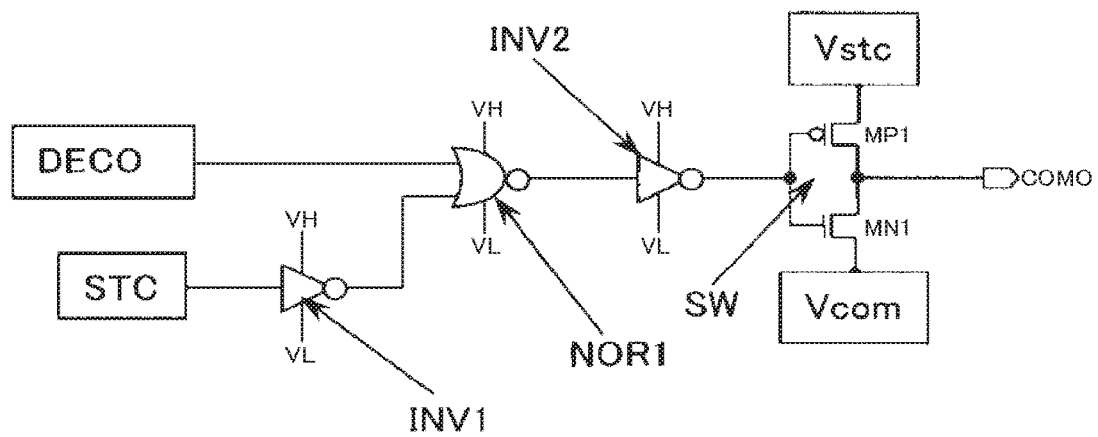
FIG. 10 is a circuit diagram showing a circuit configuration of an example of a selection circuit shown in FIG. 9.

FIG. 10 is a circuit diagram showing a circuit configuration of an example of the selection circuit (SCH1 to SCH20) shown in FIG. 9.

The selection circuit shown in FIG. 10 inputs an output (DECO) of the address decoder circuits (DEC1 to DEC20) and an inverted signal of the touch panel scanning signal (STC) inverted by an inverter (INV1) to a NOR circuit (NOR1), inverts an output of the NOR circuit (NOR1) with an inverter (INV2), and inputs the output to a switch circuit (SW) to thereby select the touch panel scanning voltage (Vstc) or the counter electrode (Vcom) and output the voltage to the counter electrodes (CT1 to CT20) of the blocks.

Consequently, when one of the address decoder circuits (DEC1 to DEC20) is selected, the selection circuit switches the touch panel scanning voltage (Vstc) and the counter voltage (Vcom) and outputs the voltages to the counter electrodes of the blocks according to a touch panel scanning signal (STC).

That is, in the selection circuit shown in FIG. 8, the output of the NOR circuit (NOR1) is at an H level when the output (DECO) of the address decoder circuits (DEC1 to DEC20) is at a Low level (hereinafter, L level) and the touch panel scanning signal (STC) is at a High level. (hereinafter, H level). Therefore, the switch circuit (SW) selects the touch panel scanning voltage (Vstc). When the touch panel scanning signal (STC) is at the L level or the output (DECO) of the address decoder circuits (DEC1 to DEC20) is at the H level, the output of the NOR circuit (NOR1) is at the L level. Therefore, the switch circuit (SW) selects the counter voltage (Vcom).

Figure 11:
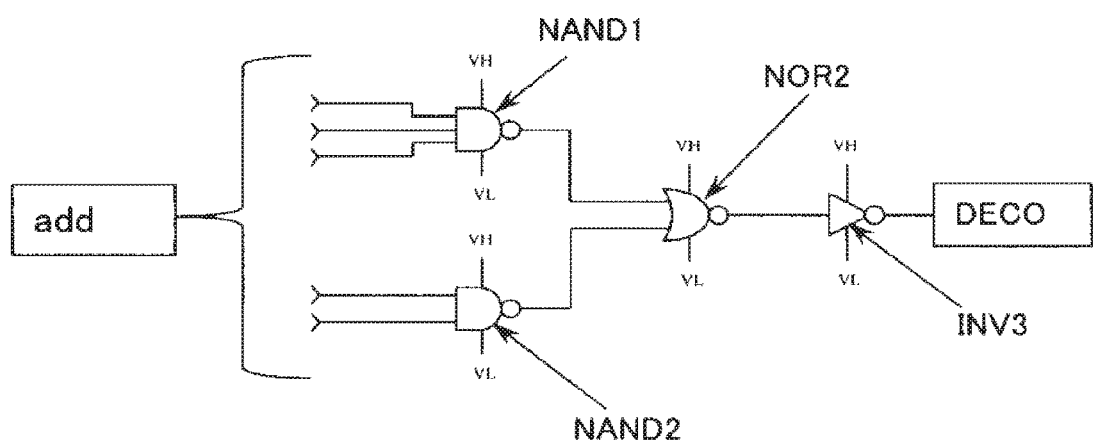
FIG. 11 is a circuit diagram showing a circuit configuration of an example of an address decoder circuit shown in FIG. 9.

FIG. 11 is a circuit diagram showing a circuit configuration of an example of the address decoder circuits (DEC1 to DEC20) shown in FIG. 7.

As shown in FIG. 11, concerning each of five address signals (addres), the address signal or an inverted signal obtained by inverting the address signal with an inverter is input to the address decoder circuits (DEC1 to DEC20). The address decoder circuits (DEC1 to DEC20) decode the address signal or the inverted signal on the basis of combinations of the five address signals (addres) and inverted signals of the five address signals (addres).

The address decoder circuit shown in FIG. 11 inputs an address signal (add) of a predetermined combination of the five address signals (addres) and the inverted signals of the five address signals (addres), which are input to the address decoder circuit, to NAND circuits (NAND1 and NAND2), inputs outputs of the NAND circuits (NAND1 and NAND2) to a NOR circuit (NOR2), and inverts an output of the NOR circuit (NOR2) with an inverter (INV3) to obtain an output (DECO) of the address decoder circuit. Therefore, in the address decoder circuit shown in FIG. 11, when a combination of address signals coincides with a combination of address signals set in the address decoder circuit, a voltage at the L level is output as the output (DECO) of the address decoder circuit. When the combination of address signals does not coincide with the combination of address signals set in the address decoder circuit, a voltage at the H level is output as the output (DECO) of the address decoder circuit.

Figure 12:
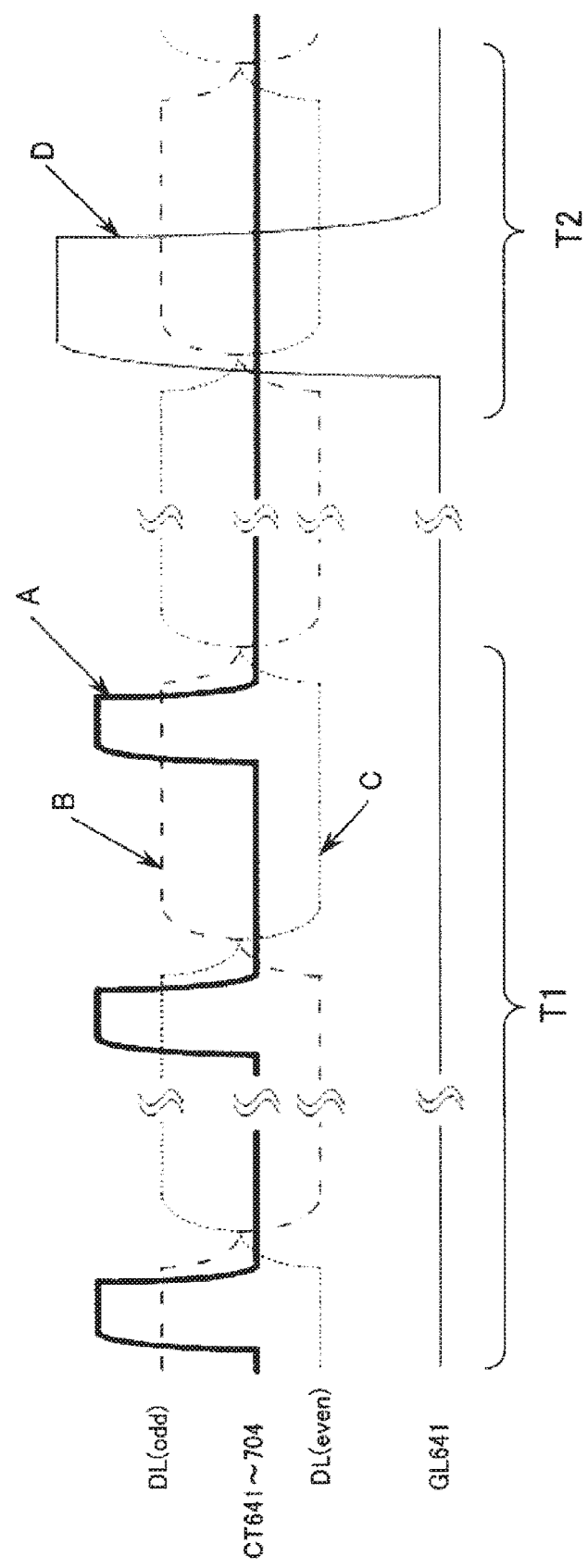
FIG. 12 is a diagram for explaining driving waveforms during touch panel detection and during pixel writing in the touch panel-incorporating liquid crystal display device.

FIG. 12 is a diagram for explaining driving waveforms during touch panel detection and during pixel writing in the touch panel-incorporating liquid crystal display device.

A in FIG. 12 indicates a voltage waveform of the touch panel scanning voltage (Vstc) supplied to the counter electrode (CT11) in 641st to 704th display lines of an eleventh block among the counter electrodes divided into twenty blocks. B in FIG. 12 indicates a waveform of a video voltage supplied to the video lines (DL) in odd number rows. C in FIG. 12 indicates a waveform of a video voltage supplied to the video lines (DL) in even number rows. D in FIG. 12 indicates a gate signal supplied to a gate electrode of a thin-film transistor in the 641st display line via a 641st scanning line (GL). T1 indicates a touch position detection period and T2 indicates a pixel writing period.

The touch position detection period (T1) is set to a period other than the pixel writing period (T2) in order to prevent the influence on display. In the touch position detection period (T1), in order to increase detection sensitivity, a plurality of times of scanning is performed by the scanning electrode (TX) in the same place, i.e., in FIG. 12, the touch panel scanning voltage (Vstc) is supplied to the counter electrode (CT11) of the eleventh block a plurality of times. Within the pixel writing period (T2), the touch panel scanning voltage (Vstc) is not supplied and the counter voltage (Vcom) is supplied to the counter electrode (CT11) of the eleventh block.

Figure 13:
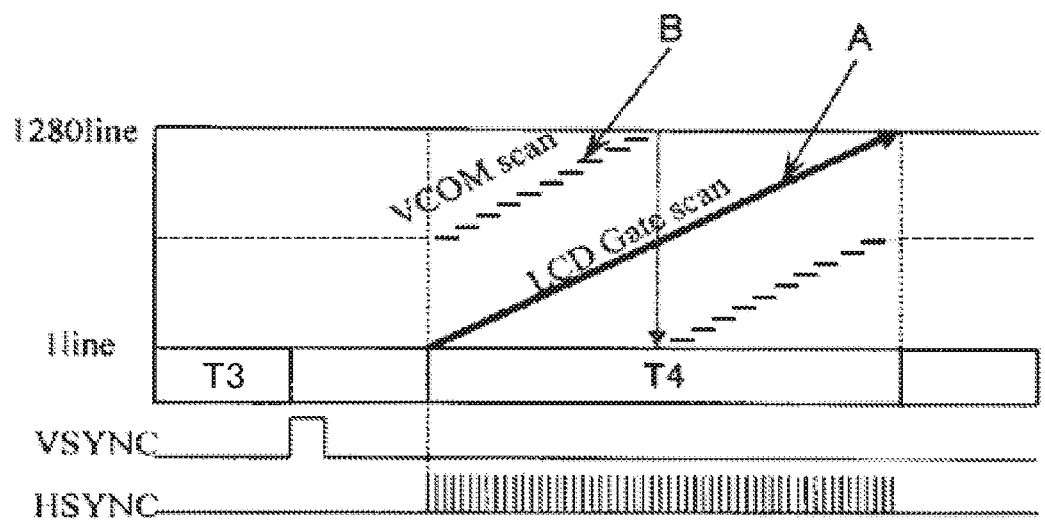
FIG. 13 is a diagram for explaining timings during touch panel detection and during pixel writing in the touch panel-incorporating liquid crystal display device.

FIG. 13 is a diagram for explaining timings during touch panel detection and during pixel writing in the touch panel-incorporating liquid crystal display device.

A in FIG. 13 indicates pixel writing timing from a first display line to a 1280th display line in a pixel writing period (T4) of one frame. B in FIG. 13 indicates touch panel detection timing in the counter electrodes (CT1 to CT20) of the blocks divided into the twenty blocks.

As shown in FIG. 13, a counter electrode in an arbitrary display line is caused to function as the scanning electrode (TX). A scanning operation during touch panel detection is performed in a place different from a place of gate scanning for performing pixel writing. In FIG. 13, T3 indicates a blanking period, VSYNC indicates a vertical synchronization signal, and HSYNC indicates a horizontal synchronization signal.

In the liquid crystal driver IC (DRV) in this embodiment, among a terminal group arranged on one side of the display area (AR) of the semiconductor chip, the video line terminal (TAD) connected to the video line DL is arranged in the center and the terminals (A1 and A2) connected to the counter electrode wires (CTL) are arranged at left and right ends of the video line terminal (TAD).

In the capacitance type touch panel, in order to detect a change in capacitance due to a finger or the like, the width of a scanning electrode for performing alternating-current driving is desirably about 4 to 5 mm. Therefore, the number of scanning electrodes increases according to an increase in the size of the liquid crystal display panel.

In the current liquid crystal display panel for portable mobile, the dimension in the longitudinal direction is 120 mm because of a request for a 5.5 inch display area. Therefore, if the counter electrode (CT) is divided at width of 5 mm, twenty-four counter electrodes are formed. On the other hand, for the current smart phone, WVGA (480RGB× 800) of a 4 inch class is generally used and the dimension in the longitudinal direction is 90 mm. Therefore, if the counter electrode (CT) is divided at width of 5 mm, eighteen counter electrodes are formed.

Therefore, in the liquid crystal driver IC (DRV) in this embodiment, the terminals (A1 and A2) connected to the counter electrode wires (CTL) are twenty-four terminals to be adaptable up to a 5.5 inch liquid crystal display panel.

Further, in the liquid crystal driver IC (DRV) in this embodiment, the number of terminals in use used for connection to the counter electrode wires (CTL) can be switched in a range of one to twenty-four to be adaptable to liquid crystal display panels including various numbers of counter electrodes.

As explained above, in order to prevent image quality deterioration, the counter electrode wires (CTL) need to have low resistance. Therefore, in the liquid crystal driver IC (DRV) in this embodiment, the terminals A1 and A2 having the same function are provided at the left and right ends of output terminals of the semiconductor chip to make it possible to supply power to the counter electrode (CT) from both the sides.

Figure 14:
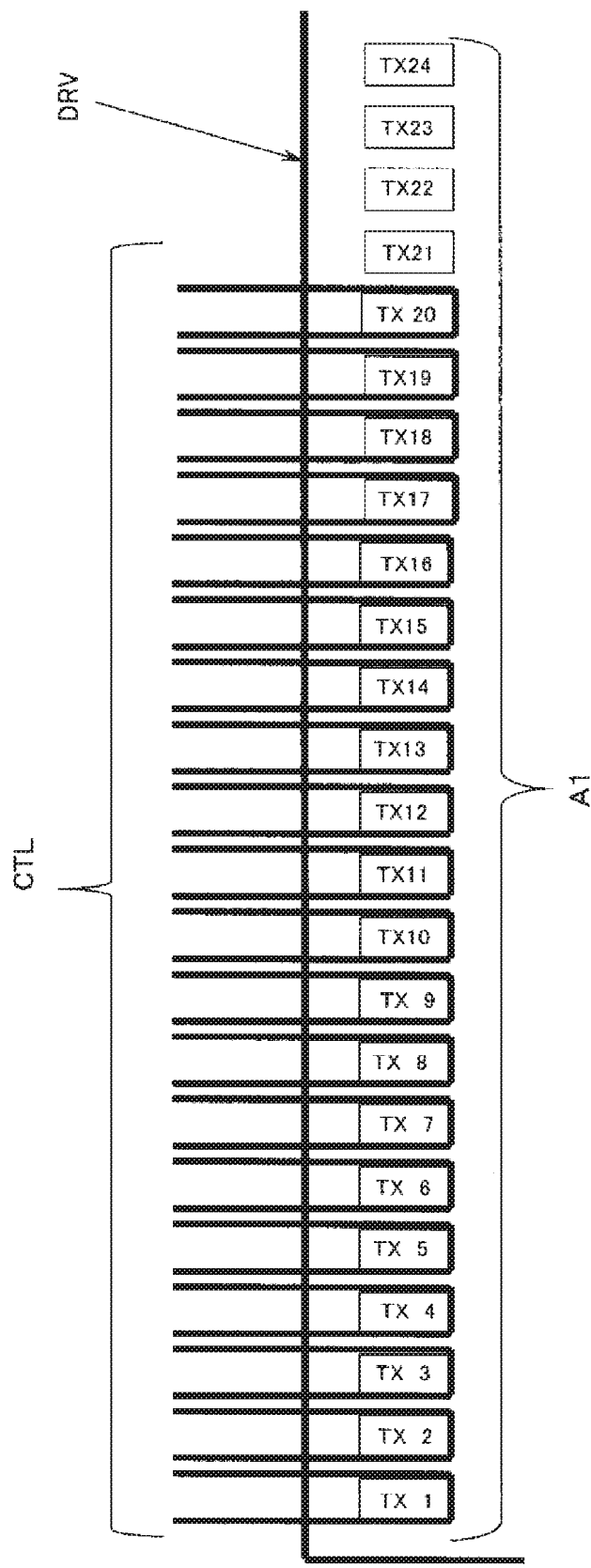
FIG. 14 is a diagram showing a connection example of terminals (A1) of a liquid crystal driver IC in an embodiment of the present invention connected when divided counter electrodes are directly driven.

In FIG. 14, a connection example of the terminals (A1) of the liquid crystal driver IC (DRV) in this embodiment connected when the divided counter electrodes (CT) are directly driven is shown.

Note that, in FIG. 14, a plurality of terminals (terminals A1) on the left side in a terminal group formed on a side on the display area (AR) side of the semiconductor chip forming the liquid crystal driver IC (DRV) in this embodiment is shown.

As explained above, in the liquid crystal driver IC (DRV) in this embodiment, the number of terminals in use used for connection to the counter electrode wires (CTL) can be switched in a range of one to twenty-four corresponding to the scanning electrodes TX1 to TX24. However, in FIG. 14, the twenty ends of the scanning electrodes TX1 to TX20 are used. The right side among the terminal group formed on the side on the display area (AR) side of the semiconductor chip forming the liquid crystal driver IC (DRV) in this embodiment has the same configuration.

In FIG. 14, the counter electrode wires (CLT) connected to the counter electrodes CT1 to CT20 are connected to the respective terminals of the scanning electrodes TX1 to TX20.

The terminals for performing touch position detection output the touch panel scanning voltage (Vstc) and the other terminals output the counter voltage (Vcom), for example, at timings shown in FIGS. 12 and 13.

Figure 15:
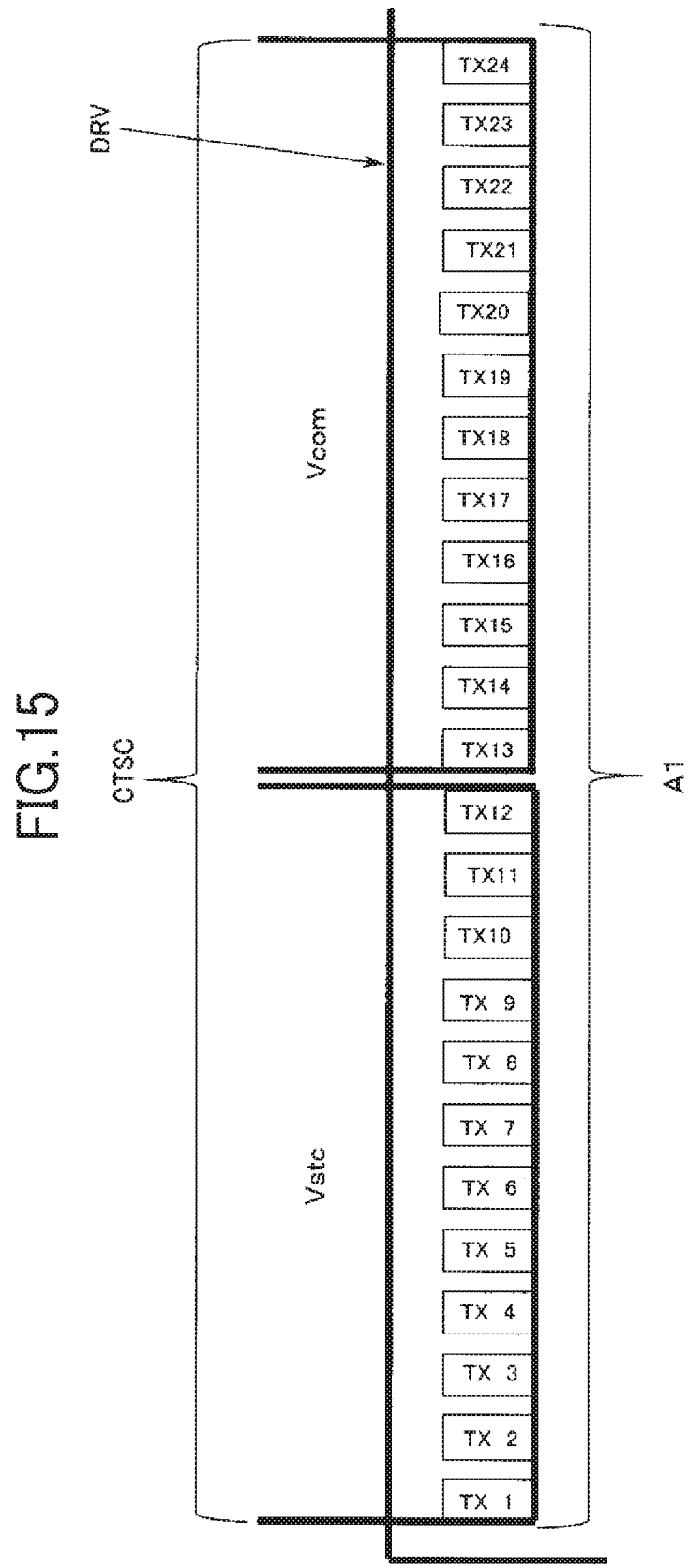
FIG. 15 is a diagram showing a connection example of the terminals (A1) of the liquid crystal driver IC in the embodiment of the present invention connected when the counter electrode selecting circuit shown in FIG. 8 is used.

In FIG. 15, a connection examples of the terminals (A1) of the liquid crystal driver IC (DRV) in this embodiment connected when the counter electrode selecting circuits (CTSC) shown in FIG. 8 are used.

In the liquid crystal driver IC (DRV) in this embodiment, a data value of a register on the inside is switched, whereby the terminals of the scanning electrodes TX1 to TX12 are fixed as terminals for outputting the touch panel scanning voltage (Vstc) and the terminals of the scanning electrodes TX13 to TX24 are fixed as terminals for outputting the counter voltage (Vcom) to output the touch panel scanning voltage (Vstc) and the counter voltage (Vcom) to the counter electrode selecting circuits (CTSC) shown in FIG. 8.

In the case of FIG. 15, output impedance of output terminals of the liquid crystal driver IC (DRV) in this embodiment is 100Ω. Therefore, by connecting twelve output terminals in parallel for each of the touch panel scanning voltage (Vstc) and the counter voltage (Vcom), it is possible to reduce output impedance of the terminals for outputting the touch panel scanning voltage (Vstc) and the counter voltage (Vcom) to 100Ω÷12=8.3Ω.

In the liquid crystal driver IC (DRV) in the past, the terminals for outputting the control signal for driving the scanning line driving circuits (GES) are arranged in the terminal group formed on the side on the display area (AR) side (hereinafter referred to as output side) of the semiconductor chip forming the liquid crystal driver IC (DRV).

However, since the counter electrode wires (CTL) need to have low resistance, the terminals (A1 and A2) connected to the counter electrode wires (CTL) need to be arranged on the side on the outside side of the semiconductor chip forming the liquid crystal driver IC (DRV).

In addition, if the terminals for outputting the control signal for driving the scanning line driving circuits (GES) are arranged on the side on the output side of the semiconductor chip forming the liquid crystal driver IC (DRV), a chip size increases, leading to an increase in chip costs.

Therefore, in this embodiment, the terminals (B1 and B2) for outputting the control signal for driving the scanning line driving circuits (GES) are arranged on the opposite side of the display area (AR) (hereinafter referred to as input side) of the semiconductor chip forming the liquid crystal driver IC (DRV).

Figure 16:
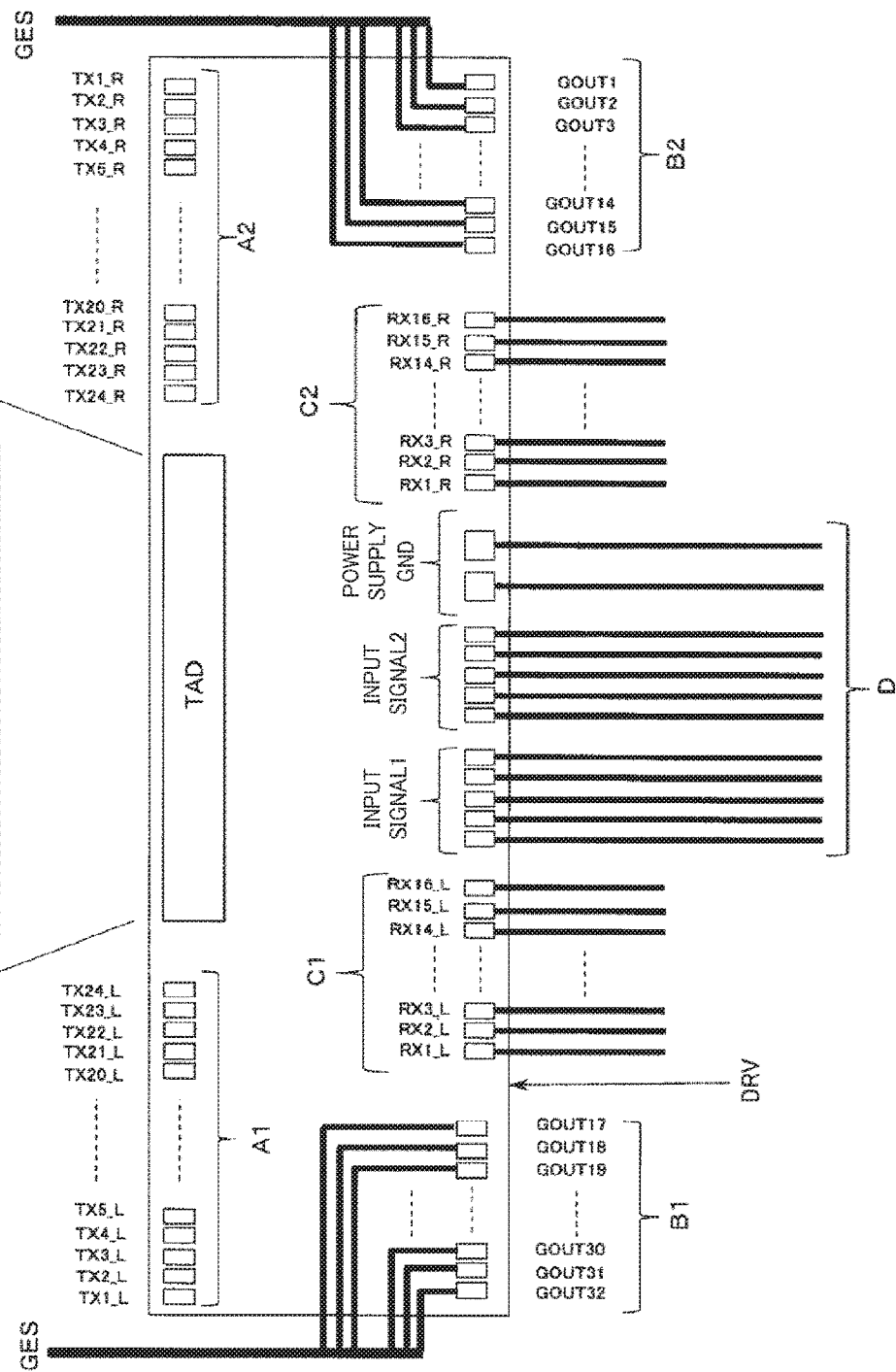
FIG. 16 is a diagram showing a connection example of input side terminals of the liquid crystal driver IC in the embodiment of the present invention.

In FIG. 16, a connection example of the terminals on the input side of the liquid crystal driver IC (DRV) in this embodiment is shown.

In FIG. 16, TAD denotes a video line terminal, A1 and A2 denote terminals connected to the counter electrode wires (CTL), B1 and B2 denote terminals for outputting the control signal for driving the scanning line driving circuits (GES), C1 and C2 denote terminals to which detection signals detected by the detection electrodes (RX) of the touch panel are input, and D denotes terminals to which an input signal and a power supply voltage from the outside are input.

Figure 17:
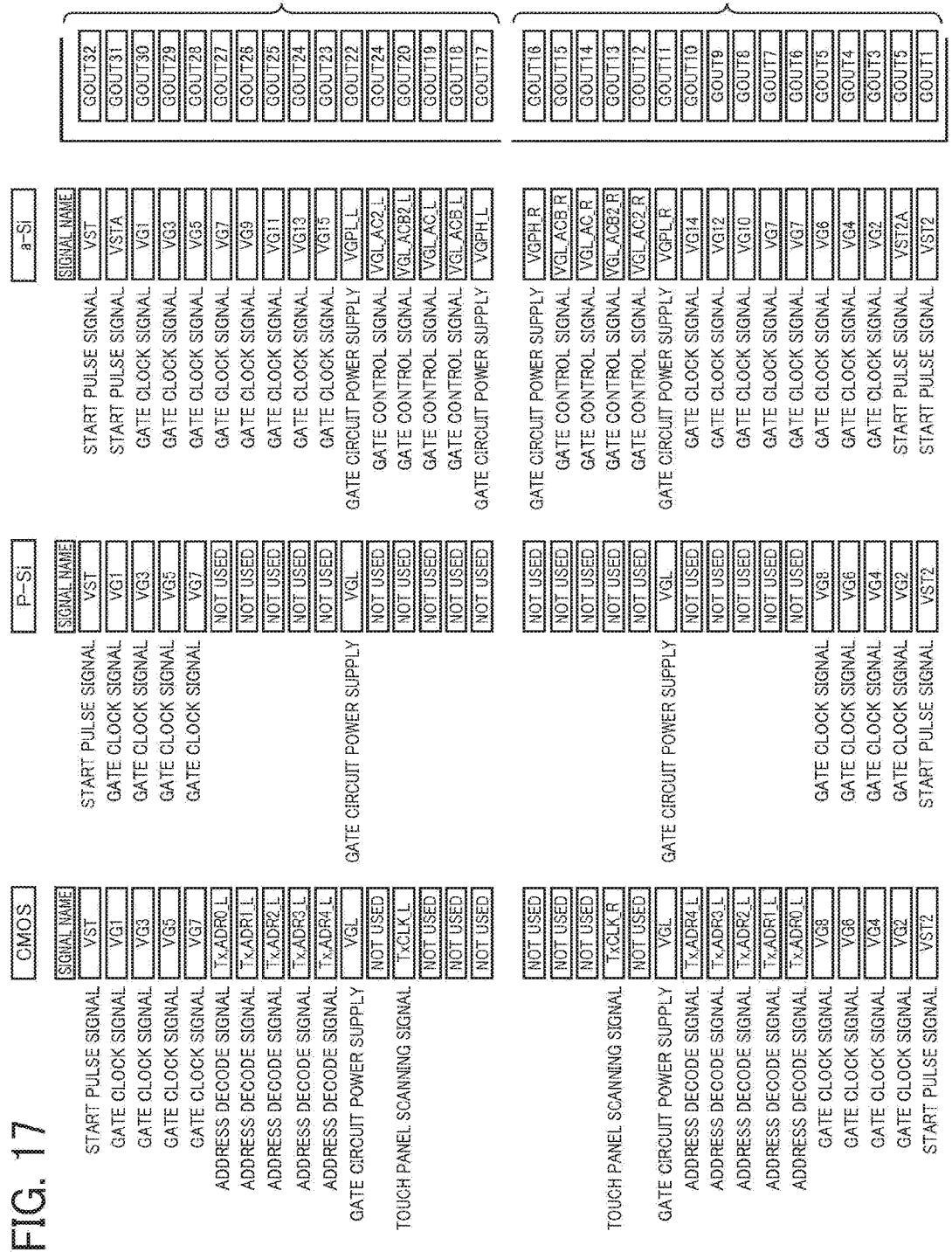
FIG. 17 is a diagram showing a connection example of terminals (B1 and B2) arranged on an input side of the liquid crystal driver IC in the embodiment.

In FIG. 17, a connection example of the terminals (B1 and B2) arranged on the input side of the liquid crystal driver IC (DRV) in this embodiment is shown.

When a gate selection voltage of the thin-film transistors (TFT) of the pixels is represented as VGH and a gate non-selection voltage of the thin-film transistors is represented as VGL, the scanning line driving circuits (GES) including the driving circuit having the a-Si single channel circuit configuration or the driving circuit having the p-Si single channel circuit configuration input a driving signal having amplitude (VGH-VGL) and perform a gage scanning operation.

Likewise, the address signal (addres) of the counter electrode selecting circuits (CTSC) including the driving circuit having the CMOS circuit configuration is a signal having amplitude (VGH-VGL).

However, voltage levels necessary for an amorphous silicon thin-film transistor (a-Si TFT) in which amorphous silicon is used for a semiconductor layer are, for example, VGH=16V and VGL=−13V. Voltage levels necessary for a polysilicon thin-film transistor (p-Si TFT) in which n-type polysilicon is used for a semiconductor layer are, for example, VGH=11V and VGL=−8V. Therefore, the voltage levels necessary for an amorphous silicon thin-film transistor (a-Si TFT) and the voltage levels necessary for a polysilicon thin-film transistor (p-Si TFT) are different.

The driving circuit having the a-Si single channel circuit configuration, the driving circuit having the p-Si single channel circuit configuration, and the driving circuit having the CMOS circuit configuration respectively require different driving waveforms because of the circuit configurations. If the respective driving waveforms are output at separate output terminals, a chip size increases according to an increase in the number of terminals.

Therefore, in the liquid crystal driver IC (DRV) in this embodiment, the respective driving signals of the driving circuit having the a-Si single channel circuit configuration, the driving circuit having the p-Si single channel circuit configuration, and the driving circuit having the CMOS circuit configuration incorporated in the liquid crystal display panel output from the terminals or the waveforms of the driving signals can be switched using the same common terminal according to a data value written in the register.

The voltage levels of VGH and VGL can be switched according to a data value written in the register to enable one common terminal to cope with the driving circuit having the a-Si single channel circuit configuration, the driving circuit having the p-Si single channel circuit configuration, and the driving circuit having the CMOS circuit configuration.

For example, in FIG. 17, in a terminal GOUT7 of the terminals (B2) on the right side of the liquid crystal driver IC (DRV), when an incorporated circuit is the driving circuit having the a-Si single channel circuit configuration (a-Si in FIG. 17), a "gate clock signal (VG10)" is output. When the incorporated circuit is the driving circuit having the p-Si single channel circuit configuration (p-Si in FIG. 17), the terminal is "not used". When the incorporated circuit is the driving circuit having the CMOS circuit configuration (CMOS in FIG. 17), an "address decode signal (Tx_ADR1_R)" is output.

In the in-cell touch panel in this embodiment, the scanning electrodes (TX) are pulse-driven at a voltage of about 4 V to 6 V and a voltage change in the detection electrodes (RX) is detected.

When parasitic capacitance between the scanning electrodes (TX) and the detection electrodes (RX) changes because of a finger or the like and the scanning electrodes (TX) are pulse-driven at a voltage of about 4 V to 6 V, voltage fluctuation of the detection electrodes (RX) changes. Therefore, it is possible to detect a touch position by measuring the voltage of the detection electrodes (RX).

Therefore, upper and lower wiring layers and wires on both sides of the wires for the detection electrodes (RX) on the main flexible printed circuit substrate (MFPC) are shielded by a ground voltage (GND) to prevent the wires from being affected by external noise.

In the liquid crystal driver IC (DRV) in this embodiment, when a touch sense function is incorporated in the liquid crystal driver IC (DRV), input terminal positions for detection signals detected by the detection electrodes (RX) are important.

In the liquid crystal driver IC (DRV) in this embodiment, as signals and voltages input to input terminals (D), there are an input signal 1, an input signal 2, a power supply, and a GND. The input signal 1 and the input signal 2 are respectively signals of different interfaces. The two signals are not simultaneously used. One of the systems is used according to the configuration on the main body side.

Further, in the in-cell touch panel, the wires for the detection electrodes (RX) are connected to the main flexible printed circuit board (MFPC) of the TFT substrate (2, SUB1) from the connection flexible printed circuit board 53 connected to a substrate (e.g., a glass substrate) on the CF substrate (3, SUB2) side by FOG (Film On Glass). Therefore, the wires have to be freely laid out in response to a request for an external shape of a product including the main flexible printed circuit board (MFPC).

Therefore, in the liquid crystal driver IC (DRV) in this embodiment, one set of the input terminals (C1 and C2) for the detection signals detected by the detection electrodes (RX) are provided on each of the sides of the input terminals (D).

The input terminals (C1 and C2) for the detection signals detected by the detection electrodes (RX) are arranged as shown in FIG. 16. Therefore, the wires do not cross the scanning line driving circuit signal wires (GTL) wired to the liquid crystal display panel side and are not affected by noise.

Further, since the terminals having the same functions are arranged on the left and right, it is possible to select the terminals in use according to a request for an external shape of a product. Only one of the input terminals (C1 and C2) for the detection signals detected by the detection electrodes (RX) is used according to a product.

Figure 18:
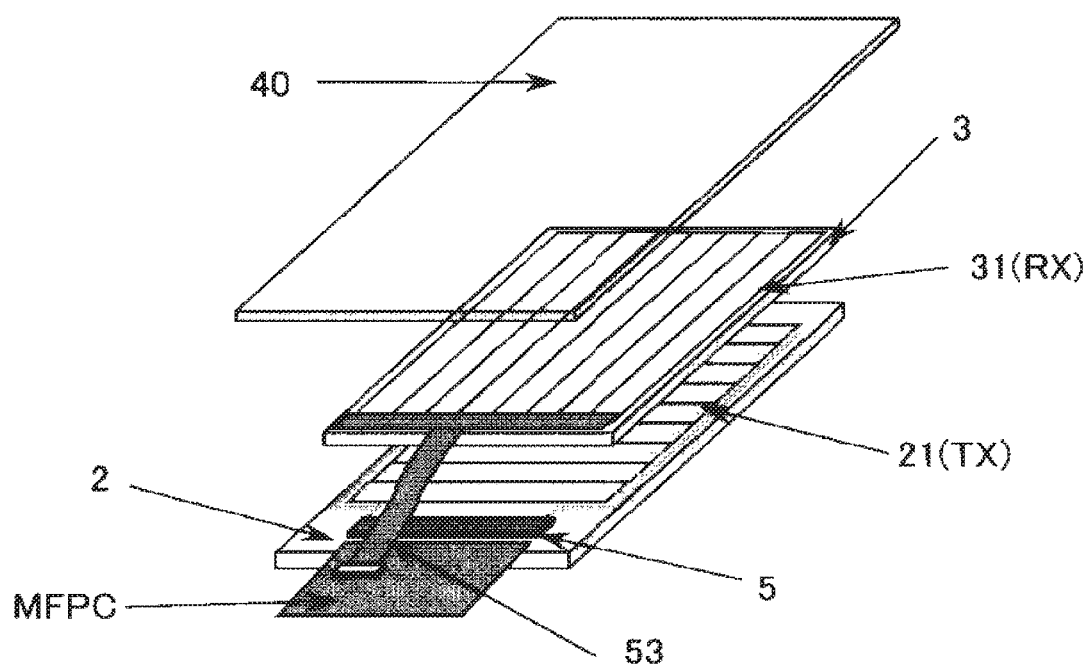
FIG. 18 is a configuration diagram of the liquid crystal driver IC in the embodiment in which terminals (C1) on the left side are used.
Figure 19:
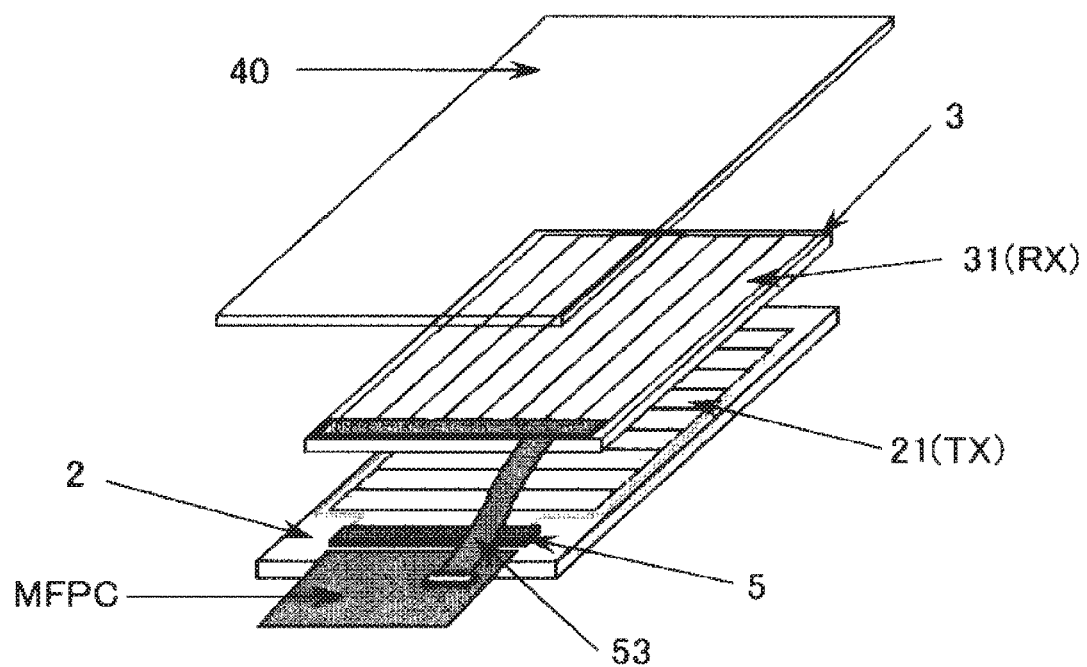
FIG. 19 is a configuration diagram of the liquid crystal driver IC in the embodiment in which terminals (C2) on the right side are used.

In FIG. 18, a configuration in which the terminals on the left side (C1) are used as the input terminals for the detection signals detected by the detection electrodes (RX) is shown. In FIG. 19, a configuration in which the terminals on the right side (C2) are used as the input terminals for the detection signals detected by the detection electrodes (RX) is shown.

The invention devised by the inventor is specifically explained above on the basis of the embodiment. However, the present invention is not limited to the embodiment. It goes without saying that the present invention can be variously changed without departing from the spirit of the present invention.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
a first substrate including a plurality of pixel electrodes, a plurality of touch electrodes, a plurality of video lines extending along a first direction and supplying a video signal, and a row of connecting terminals extending along a second direction,
wherein
the plurality of touch electrodes is used as a touch driving electrode,
the row of connecting terminals includes a first partial row having a plurality of first terminals arranged in the second direction and a second partial row having a plurality of second terminals arranged in the second direction,
the plurality of first terminals connects to the plurality of touch electrodes,
the plurality of second terminals connects to the plurality of video lines,
the row of connecting terminals has end portions at both end of the row of connecting terminals, and
the first partial row is located closer to one of the end portions than the second partial row in the second direction.

2. The display device according to claim 1, wherein
the first substrate includes a plurality of pixel transistors, a plurality of scanning lines for supplying a scanning voltage to the pixel transistors, and a scanning line driving circuit configured to supply the scanning voltage to the plurality of scanning lines.

3. The display device according to claim 2, wherein
a plurality of scanning line driving circuit wirings are electrically connected with the scanning line driving circuit.

4. The display device according to claim 3, wherein
a plurality of third terminals electrically connects with the plurality of scanning line driving circuit wirings respectively.

5. The display device according to claim 4, wherein
the first substrate includes a second row of connecting terminals that has the plurality of third terminals.

6. The display device according to claim 1, further comprising a semiconductor chip,
wherein
the semiconductor chip electrically connects with the plurality of first terminals and the plurality of second terminals.

7. The display device according to claim 6, wherein
the plurality of first terminals forms both ends of the row of connecting terminals.

8. A display device comprising:
a display panel including a display area;
a plurality of pixels including a pixel electrode, and arranged in a matrix shape for forming the display area;
a plurality of touch electrodes;
a plurality of video lines extending along a first direction and supplying a video signal;
a plurality of touch signal lines extending along the first direction; and
a row of connecting terminals formed outer area of the display area,
wherein
the row of connecting terminals extends along a second direction that is perpendicular to the first direction,
the row of connecting terminals includes a first partial row having a plurality of first terminals arranged in the second direction and a second partial row having a plurality of second terminals arranged in the second direction,
the plurality of first terminals connects to the plurality of touch signal lines,
the plurality of second terminals connects to the plurality of video lines,
the row of connecting terminals has end portions at both end of the row of connecting terminals, and
the first partial row is located closer to one of the end portions than the second partial row in the second direction.

9. The display device according to claim 8,
further comprising a plurality of scanning lines for inputting a scanning voltage to the pixels and formed above the first substrate,
a scanning line driving circuit configured to supply the scanning voltage to the plurality of scanning lines, and
a plurality of scanning line driving circuit wirings electrically connecting with the scanning line driving circuit, and extending along the first direction.

10. The display device according to claim 9, wherein
a plurality of third terminals electrically connects with the plurality of scanning line driving circuit wirings respectively.

11. The display device according to claim 8, further comprising a semiconductor chip,
wherein the semiconductor chip electrically connects with the plurality of first terminals and the plurality of second terminals.

12. A display device comprising:
a display panel including a display area;
a plurality of pixels including a pixel electrode, and arranged in a matrix shape for forming the display area;
a plurality of touch electrodes disposed in the display area;
a plurality of video lines extending along a first direction and supplying a video signal;
a plurality of touch signal lines extending along the first direction;
a plurality of scanning lines for inputting a scanning voltage to the pixels;
a scanning line driving circuit configured to supply the scanning voltage to the plurality of scanning lines;
a plurality of scanning line driving circuit wirings electrically connecting with the scanning line driving circuit, and extending along the first direction; and
a first row and a second row of connecting terminals formed outer area of the display area,
wherein
the first and second row of connecting terminals extend along a second direction that is perpendicular to the first direction,
the first row of connecting terminals includes a first partial row having a plurality of first terminals arranged in the second direction and a second partial row having a plurality of second terminals arranged in the second direction, the plurality of first terminals connects to the plurality of touch electrodes, the plurality of second terminals connects to the plurality of video lines, a plurality of third terminals of the second row of connecting terminals connects to the plurality of scanning line driving circuit wirings, the first row of connecting terminals has end portions at both end of the first row of connecting terminals, and the first partial row is located closer to one of the end portions than the second partial row in the second direction.

13. The display device according to claim 12, wherein the plurality of third terminals of the second row of connecting terminals includes a power source input terminal.

14. The display device according to claim 12, further comprising a main flexible printed circuit board, wherein the main flexible printed circuit board electrically connects with the second row of connecting terminals.

15. The display device according to claim 12, further comprising a semiconductor chip, wherein the semiconductor chip electrically connects with the plurality of first terminals and the plurality of second terminals.

\* \* \* \* \*